June 16, 1931.     A. B. CARTER     1,810,127
METHOD OF DECORATING GLASS
Filed March 3, 1930
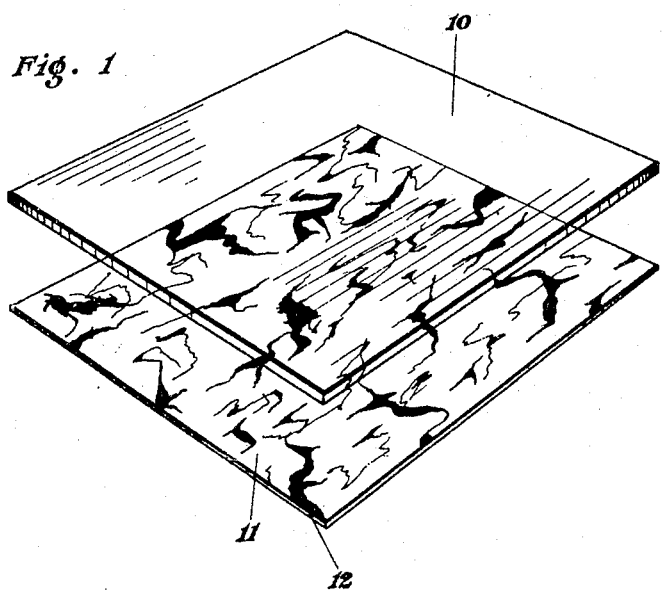
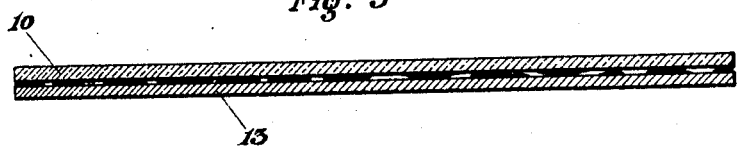
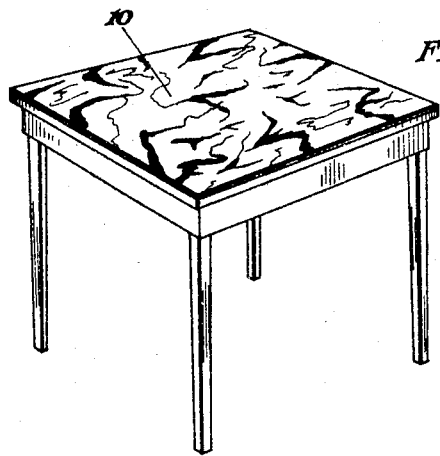
Inventor
Alva B. Carter
By Emil F. Lange
Attorney Patented June 16, 1931

1,810,127

UNITED STATES PATENT OFFICE

ALVA B. CARTER, OF LINCOLN, NEBRASKA

METHOD OF DECORATING GLASS

Application filed March 3, 1930. Serial No. 432,938.

My invention relates to the surface ornamentation of glass, the object being the provision of sheets or plates of glass which are highly ornamented on one surface to adapt them to serve as ornamental table tops and the like.

Another of my objects is the provision of a simple method for ornamenting glass in a great variety of designs.

Another of my objects is the provision of a method for giving a marbled appearance to glass.

Having in view these objects and others which will be pointed out in the following description, I will now refer to the drawings, in which Figure 1 is a view in perspective showing the method of applying the surface ornamentation to the glass.

Figure 2 is an illustration showing a table top of glass which has been ornamented by my method.

Figure 3 is a sectional view of the ornamented glass showing also the padding which protects both the ornamental layer on the glass and also the table top or other polished surface on which the ornamented glass is placed.

The method which I employ contemplates the use of a pigment carried in a menstruum which adheres to glass and having a viscosity such that it will flow slowly. The pigment itself may be of any desired kind which is obtainable in a wide variety of colors. Most paints will answer the purpose admirably but I have found that the best results may be obtained from the use of lacquers.

In carrying out my method I apply the pigments to a sheet of paper, a piece of cloth, a pane of glass or any other suitable support. The pigments are applied to this support in splotches, dots and lines and they are then allowed to flow together. In the places where the pigments do not flow together with sufficient rapidity, assistance is given by means of a brush or stick or any other suitable tool. This flowing together is not permitted to go on indefinitely until the colors have been completely blended. As soon as the edges of the blotches and lines of paint or lacquer have blended so as to produce the desired design, a sheet or plate of glass is placed in contact with the painted surface of the support and is then immediately withdrawn and the paint or lacquer is allowed to dry. Another sheet or pane of glass may then be applied to the same support for the purpose of ornamenting the second sheet or plate with a design similar to that of the first. It is usually possible to duplicate the design on a number of sheets or plates of glass from the same support.

In my drawings the glass is indicated by the numeral 10. This is placed on the support 11 which is covered by the pigment 12 in the desired design after the blending of the pigments at their edges. This pigment design 12 is transferred to the back of the glass as shown in Figure 3. After the paint or lacquer has been thoroughly dried, the surface of the paint or lacquer is covered by any suitable material as shown at 13 in Figure 3. The primary purpose of this covering is to prevent injury to the furniture or other article on which the ornamented glass is placed. It also serves, however, to protect the paint or lacquer from being scratched.

The method is one of extreme simplicity but it produces designs of striking beauty. By properly placing well selected colors on the paper or other support, it is a relatively simple matter to obtain glass having the appearance of onyx or marble or similar stones.

In some cases, especially where the design has a large background of white, the method may be varied so as to produce the design directly on the glass surface without the use of the support. For imitating onyx and marble, for example, the streaks may be applied directly to the glass surface in any of the suitable colors. The entire surface of the glass is then flooded with a white pigment which blends with the darker pigments at their edges so as to produce an ornamental surface which strikingly resembles that of onyx or marble.

Having thus descrbied my invention in such full, clear, and exact terms that its operation and utility will be readily understood by others skilled in the art to which it pertains, what I claim as new and desire to secure by Letters Patent of the United States is:

The method of ornamenting glass surfaces with pigments suspended in a slow flowing medium which adheres to glass, the said method consisting in applying the pigments in a plurality of colors and shades to a suitable support in designs such that the suspended pigments in their medium will slowly flow toward each other to blend at the edges, in then applying a piece of glass to the pigment treated support, in removing the glass with some of the pigment adhering thereto in the blended design, and in finally flooding the pigment treated surface of the glass with a white pigment in a similar medium to provide for a blending of the reflected light rays in addition to the blending of the pigments.

In testimony whereof I affix my signature.

ALVA B. CARTER.